(12) United States Patent
Rached et al.

(10) Patent No.: US 7,372,894 B2
(45) Date of Patent: May 13, 2008

(54) METHOD OF PROCESSING A SIGNAL BY A RADIO RECEIVER AND RADIO RECEIVER FOR THE IMPLEMENTATION OF THE METHOD

(75) Inventors: Nidham Ben Rached, Paris (FR); Thierry Lucidarme, Montigny le Bretonneux (FR)

(73) Assignee: Alcatel Lucent, Paris (FR)

( * ) Notice: Subject to any disclaimer, the term of this patent is extended or adjusted under 35 U.S.C. 154(b) by 739 days.

(21) Appl. No.: 10/774,711

(22) Filed: Feb. 9, 2004

(65) Prior Publication Data

US 2004/0179578 A1  Sep. 16, 2004

(30) Foreign Application Priority Data

Feb. 10, 2003  (FR) .................................. 03 01534

(51) Int. Cl.
   H04B 1/00    (2006.01)
(52) U.S. Cl. .................................... 375/148
(58) Field of Classification Search ........ 375/147–148, 375/260, 285, 267, 346–350; 455/132–135, 455/140; 370/334
   See application file for complete search history.

(56) References Cited

U.S. PATENT DOCUMENTS

| | | | |
|---|---|---|---|
| 5,684,793 A | | 11/1997 | Petri et al. |
| 5,952,963 A | * | 9/1999 | Shen et al. .................. 342/367 |
| 5,978,414 A | * | 11/1999 | Nara ........................... 375/225 |
| 6,404,760 B1 | * | 6/2002 | Holtzman et al. ........... 370/342 |
| 7,031,374 B1 | * | 4/2006 | McDonough ................ 375/148 |
| 7,113,548 B2 | * | 9/2006 | Tanaka et al. ............... 375/267 |
| 2001/0009562 A1 | * | 7/2001 | Ohno ........................... 375/148 |
| 2002/0024992 A1 | * | 2/2002 | Ogawa et al. ................ 375/148 |
| 2003/0058929 A1 | * | 3/2003 | Cox et al. .................... 375/150 |
| 2004/0091021 A1 | * | 5/2004 | Arima ......................... 375/147 |
| 2005/0063496 A1 | * | 3/2005 | Guillouard et al. .......... 375/346 |

FOREIGN PATENT DOCUMENTS

| | | |
|---|---|---|
| EP | 0 813 313 | 12/1997 |
| EP | 1 158 688 | 11/2001 |

OTHER PUBLICATIONS

Yue L. "Analysis of Generalized Selection Combining Techniques" VTC 2000-Spring. 2000-IEEE 51st. Vehicular Technology Conference Proceedings. Tokyo, Japan, May 15-18, 2000, IEEE Vehicular Technology Conference, New York, NY : IEEE, US, vol. 2 of 3. Conf. 51, May 15, 2000, pp. 1191-1195, XP000968058, ISBN: 0-7803-5719-1 Sections I and II.

* cited by examiner

Primary Examiner—Khanh C. Tran
(74) Attorney, Agent, or Firm—Sughrue Mion, PLLC (57) ABSTRACT

In a spread spectrum digital radiocommunication receiver, a first estimate of a symbol transmitted by a sender is calculated by applying to a radio signal received a processing taking into account a number N of propagation paths from the sender, a parameter of reliability of the first estimate is evaluated, and when the reliability parameter evaluated does not satisfy a confidence criterion, a second estimate of the symbol is calculated by taking into account at least one (N+1)-th propagation path from the sender in the processing applied to the radio signal received.

33 Claims, 3 Drawing Sheets

METHOD OF PROCESSING A SIGNAL BY A RADIO RECEIVER AND RADIO RECEIVER FOR THE IMPLEMENTATION OF THE METHOD

BACKGROUND OF THE INVENTION

The present invention relates to the processing of the signal in spread spectrum digital radiocommunication receivers.

The invention finds application in the field of code-division multiple access (CDMA) radiocommunications, such as UMTS ("Universal Mobile Telecommunication System").

In a CDMA system, the symbols transmitted, binary (±1) or quaternary (±1±j), are multiplied by spreading codes composed of samples, called "chips", whose rate (3.84 Mchip/s in the case of UMTS) is greater than that of the symbols transmitted. Orthogonal or quasi-orthogonal spreading codes are allotted to various logical channels sharing the same carrier frequency, so as to allow each receiver to detect the sequence of symbols which is destined therefor, by multiplying the signal received by the corresponding spreading code.

An advantage of the CDMA system is that it makes it possible to utilize radio propagation multipaths, by using what is referred to as a rake receiver.

The rake receiver performs coherent demodulation based on an approximation of the impulse response of the radio propagation channel by a series of spikes, each spike appearing with a delay corresponding to the propagation time along a particular path and having a complex amplitude corresponding to the attenuation and to the phase shift of the signal along this path (instantaneous realization of fading). By analyzing several reception paths, that is to say sampling, several times, the output from a filter matched to the spreading code of the channel, with delays corresponding respectively to these paths, the rake receiver obtains multiple estimates of the symbols transmitted, which are combined to obtain a diversity gain. Combining can be performed in particular according to the so-called MRC (Maximum Ratio Combining) method, which weights the various estimates as a function of the complex amplitudes observed for the various paths.

In order to allow this coherent demodulation, a pilot channel can be provided for the estimation of the impulse response in the form of a succession of spikes. The impulse response is estimated by means of a filter matched to a pilot spreading code with which the sender modulates a sequence of known symbols, for example symbols set to 1. The positions of the maxima of the output from this matched filter give the delays used in the fingers of the rake receiver, and the associated complex amplitudes correspond to the values of these maxima.

The rake receiver comprises a set of fingers making it possible to process one and the same sequence of information symbols that is received along different propagation paths from the sender. These paths are usually defined as delays with respect to a reference time.

In a representation of the CDMA signal received, which representation is utilized in a conventional rake receiver, this signal y(t) may be written:

$$y(t) = \sum_k \sum_i A_i(t) \cdot b^k(t - \tau_i) \cdot c^k(t - \tau_i) + \varepsilon(t) \quad (1)$$

where k is an index of the CDMA channels superimposed on the relevant carrier, i is an index of the propagation paths existing between the sender or senders and the receiver, $b^k(t)$ is the symbol string shaped by the sender or channel k, $c^k(t)$ is the spreading code of channel k, $\tau_i$ is the estimated propagation delay for path i, $A_i(t)$ is the complex amplitude of reception along path i at the instant t, and $\varepsilon(t)$ is additive noise.

The receiver selects the paths i of greatest energy, that is to say those for which the $A_i(t)$ have on average the largest modulus. It keeps a predetermined number of paths or the entire set of paths whose energy exceeds a predetermined threshold. The conventional rake receiver supplies each of its fingers, assigned to the reception of channel k along a path i, with the parameters $\tau_i$ and $A_i(t)$ so that this finger can perform:

a signal despreading operation, equivalent to the sampling of the filter matched to the spreading code $c^k(t)$ for a delay $\tau_i$, that is to say:

$$Z_i(n) = \sum_t y(t) \cdot c^{k*}(t - \tau_i) \quad (2)$$

where the sum over t relates to the chips corresponding to the reception of the n-th symbol of the sequence transmitted over channel k. Owing to the orthogonality properties of the codes $c^k(t)$, the operation (2) picks out the contribution of path i to the signal, the other contributions being seen as noise after despreading, then an MRC weighting of the result by the conjugate of the complex amplitude $A_i(t)$, assumed constant (=$A_i(n)$) over the duration of the n-th symbol, this producing a contribution of path i to the estimate of the n-th symbol:

$$X_i(n) = Z_i(n) \cdot A_i^*(n) \quad (3)$$

These contributions are ultimately summed at the output of the rake receiver so as to deduce therefrom an estimate X(n) of the n-th symbol:

$$X(n) = \sum_i X_i(n) \quad (4)$$

In each finger, the despreading operation is that which requires the largest number of elementary operations.

Increasing the number of fingers assigned to a channel, that is to say the number of propagation paths taken into account, improves the reception performance over this channel, by virtue of the multipath diversity. However, this also increases the complexity of the calculations to be performed and hence the use of hardware or software resources in the receiver.

The number of fingers of a rake receiver is generally limited. By way of example, a mobile terminal receiver using CDMA access technology typically possesses from 4 to 8 fingers per channel to be processed.

Good management of the rake seeks to preferably assign these fingers in limited number to the channels which have the greatest need therefor. This makes it possible:

- to improve the performance in terms of signal-to-inter-ferers ratio, for a given quantity of calculations; or
- to perform a minimum quantity of calculations, for a given performance objective, and hence to make the calculation resources released available for other uses or to reduce the electrical consumption of the receiver (attractive in order to save the battery of a mobile terminal).

However, such management is not carried out in a satisfactory manner in traditional rake receivers. The fixing of a predetermined number of paths or of fingers leads to mediocre estimates when the channel exhibits greater diversity in terms of paths and to unnecessary calculations when a predominant path or a small number of paths is sufficient to produce reliable estimates. When the paths are taken into account as a function of a comparison of their energy levels with a threshold, the determination of the appropriate threshold is also problematic: one and the same value of threshold may turn out to be both too low in the presence of numerous paths and too high when a powerful path is sufficient to obtain satisfactory estimates.

An object of the present invention is to propose a mechanism which effects a good compromise between the reliability of the estimate of the information carried by the signal received and the calculation cost engendered by the operations of processing the signal in the receiver.

SUMMARY OF THE INVENTION

The invention thus proposes a method of signal processing for a spread spectrum digital radiocommunication receiver, comprising the following steps:

- calculation of an estimate of at least one symbol transmitted by sending means by applying to a radio signal received a processing taking into account at least one propagation path from the sending means;
- evaluation of a parameter of reliability of the calculated estimate; and
- when the reliability parameter evaluated does not satisfy a confidence criterion, calculation of a refined estimate of the symbol by taking into account at least one additional propagation path from the sending means in the processing applied to the radio signal received.

The steps of evaluating the reliability parameter and of calculating a refined estimate may be repeated up to a chosen maximum number of paths, within the limit of the number of fingers of the rake receiver that are assigned to this task, for as long as an estimate that is sufficiently reliable with regard to the confidence level chosen has not been obtained.

The confidence criterion can consist in the parameter of reliability of the calculated estimate exceeding a threshold. This threshold advantageously depends on a service life allocated to a communication to which the radio signal received pertains. It is typically proportional to the noise level estimated over a propagation channel between the sending means and the receiver.

Preferably, the refined estimate of the symbol is calculated by adding an estimated contribution of the additional propagation path to the estimate previously calculated for the symbol.

The method is applicable when a single sender contributes to the radio signal processed. However, it is also usable in situations of send macrodiversity. The propagation paths taken into account in the calculations of estimates include paths originating from several senders belonging to the said sending means, which send radio signal components that carry identical information symbols and that are multiplexed with different spreading codes. The despreading operations are then performed using different spreading codes.

It is advantageously possible to commence the steps of this method by performing a processing of the signal received for certain propagation paths having a significant contribution, that is to say a high reception amplitude, and to continue with less predominant paths.

By virtue of this method, only a limited number of fingers of the rake receiver can be invoked in certain cases that are favorable for performing an estimate of symbols for respective propagation paths, thus limiting the number of complex operations, such as signal despreadings, that are expensive in terms of calculation capacity. The resources thus released can serve for other purposes and also make it possible, in particular in the case where the receiver is that of a mobile terminal, to limit its battery consumption.

The propagation paths may be obtained conventionally by the analysis of an impulse response of the relevant propagation channel. This response then makes it possible to obtain the delays and the amplitudes relating to each of these paths.

The reliability parameter obtained from the estimates made by the receiver can be compared with a threshold so as to serve as a basis for taking a decision with regard to the value of symbols transmitted in the relevant signal.

The invention also proposes a spread spectrum digital radiocommunication receiver, comprising signal processing means adapted to the implementation of a method as defined hereinabove, as well as a computer program to be installed in a radiocommunication receiver, the program comprising instructions for implementing such a method upon execution of the program by signal processing means of the receiver.

DESCRIPTION OF PREFERRED EMBODIMENTS

Figure 1:
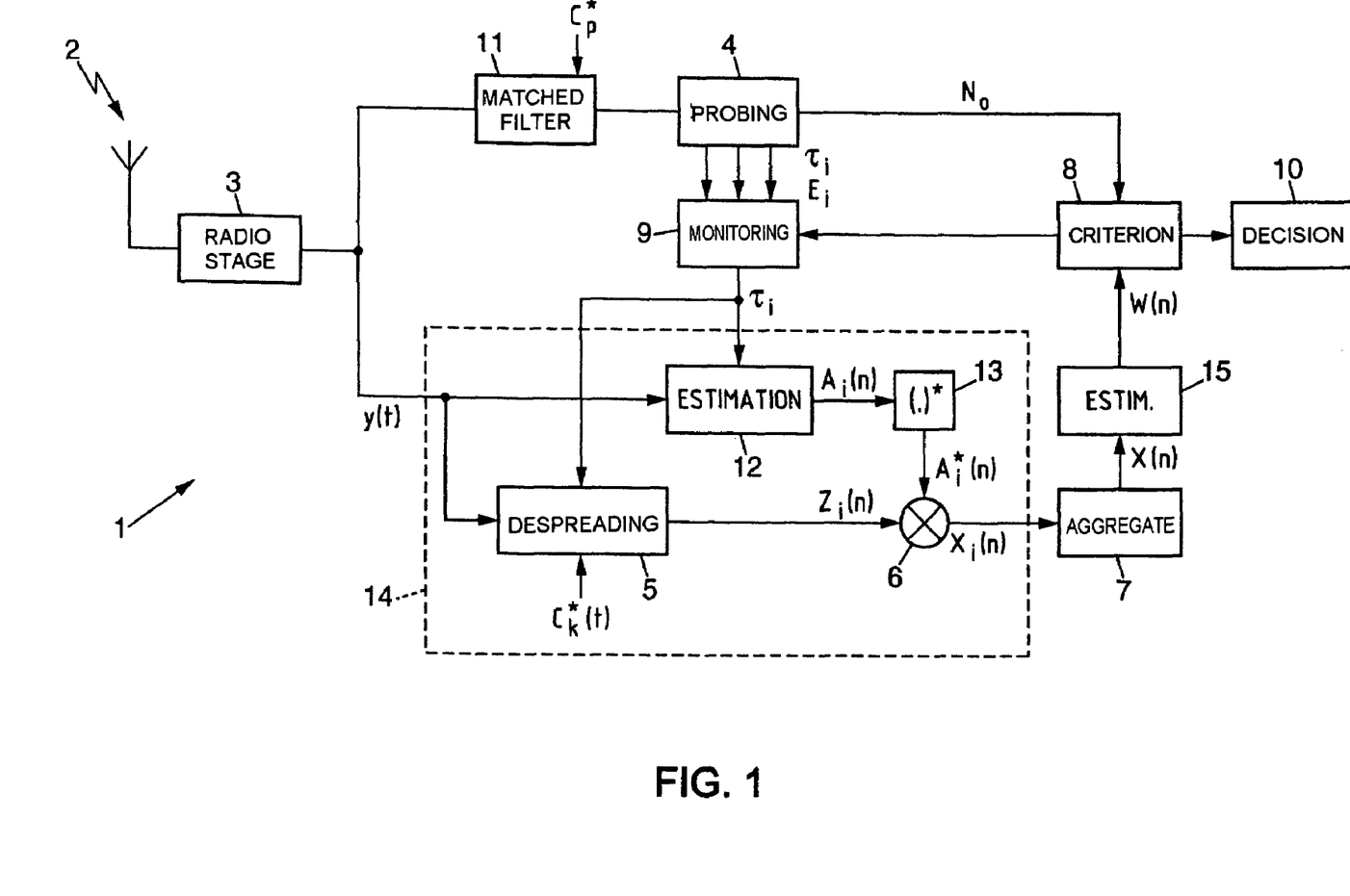
FIG. 1 is a schematic diagram of a receiver according to the invention.

FIG. 1 diagrammatically shows a radio receiver 1 able to implement the present invention. This receiver may be that of a base station or of a mobile terminal supporting spread spectrum CDMA radiocommunication technology such as UMTS technology.

The receiver 1 comprises means of reception, in particular one or more antennas 2 for receiving a signal transmitted by a sender or else a plurality of senders in the case where the receiver is embedded in a mobile terminal in a situation of macrodiversity or "soft handover", that is to say of simultaneous listening to redundant channels originating from different base stations. Considered hereinbelow is the non-restrictive case of a signal transmitted by a single sender.

A radio stage 3 is conventionally located at the input of the receiver 1, in such a way as to perform a first processing of the signal received. For example, this processing can consist in amplifying the analog signal received, in converting it into a digital signal and possibly in filtering it.

In the case of the UMTS system, phase-shift keying (PSK) is used. The signal comprises two distinct components, a real component and an imaginary component. The processing implemented by the radio stage 3 reconstructs a digital signal y(t), for example at a rate of one complex sample per chip.

As described above, the impulse response of the propagation channel can be estimated by means of a filter 11 matched to a pilot spreading code $c^P$ with which the sender modulates a sequence of known symbols. An analysis of the output of this matched filter is performed by a probing module 4. In a conventional manner, the latter does statistical calculations on the output of the matched filter 11 so as to determine delays $\tau_i$ associated with the paths or echoes of greatest energy, as well as the average reception energies $E_i$ associated with these echoes. It also estimates a level $N_0$ of the noise on the channel. Regular evaluation of these parameters is performed so as to have up-to-date knowledge of the propagation profile over the relevant channel.

The echoes of greatest energy that are detected by the probing module 4 correspond to environment-dependent main paths. The echo of greatest energy will correspond for example to a direct path between the sender and the receiver if they are in direct line of sight of one another. The other main echoes will schematically be those that give rise to the smallest number of reflections and diffractions between the sender and the receiver.

The energy $E_i$ associated with an echo is the mathematical expectation of the modulus squared of the instantaneous amplitude $A_i(t)$ of reception on the corresponding propagation path.

The module 4 then supplies a monitoring module 9 with the delays $\tau_i$ and possibly the energies $E_i$ on the selected reception paths, estimated in accordance with the pilot channel of code $c^P$ and/or in accordance with known pilot symbols inserted into the signal transmitted.

According to the invention, the monitoring module 9 does not systematically supply estimated values of delays $\tau_i$ to each of the fingers of the rake receiver 1 that are assigned to the reception of a communication channel k.

On the contrary, the monitoring module 9 initially supplies a delay value $\tau_i$ to a first finger 14 of the rake. As a variant, a limited number of delay values $\tau_i$ are supplied respectively to a limited number of fingers of the rake, less than the total number of fingers of the receiver 1. Considered hereinbelow is the nonlimiting case in which a single finger 14 at a time receives an estimated value of $\tau_i$.

The finger 14 having received such a value performs, according to (2), a despreading operation 5 on the signal y(t), which operation is equivalent to the sampling of the filter matched to the spreading code $c^k(t)$ for the delay $\tau_i$, which has been communicated to it by the monitoring module 9.

In parallel with this despreading, the active finger 14 makes an estimate 12 of the complex amplitude $A_i(n)$ of the signal over the duration of the n-th symbol, that is to say for the symbol n that one seeks to estimate. The conjugate $A_i^*(n)$ of this complex amplitude is calculated (reference 13 in FIG. 1).

The module 6 of the relevant finger 14 then proceeds to the MRC weighting of the signal despread according to (3), by multiplying it by the complex conjugate $A_i^*(n)$.

In a particularly advantageous embodiment, the monitoring module 9 performs, after reception of the estimates supplied by the probing module 4, a ranking of the main paths detected as a function of the significance of their respective contribution in the signal received y(t), for example according to a descending order of their energy $E_i$. It then transmits by priority the delay $\tau_i$ corresponding to the path of greatest energy (the highest $E_i$) to the first finger 14. This mode of operation makes it possible to obtain, initially, an estimated value $X_i(n)$ of the n-th symbol carried by the signal y(t), which estimate is based on the contribution of the most important path i in the propagation profile between the sender and the receiver 1.

As a variant, the probing module 4 itself performs such a ranking of the paths as a function of the energy that it detects for each of them. It then communicates the respective delays $\tau_i$ to the monitoring module 9, in an order in accordance with this ranking. Initially, the monitoring module 9 then merely transmits to the first finger 14 the value of $\tau_i$ that it received first from the probing module 4, that is to say the delay corresponding to the path of greatest energy detected by the module 4.

Hereinbelow, the ranking of the paths detected by the probing module 4 is regarded as being performed in the descending order of significance of their respective contribution.

The operations described above have made it possible to obtain a first estimate $X_i(n)$ of the symbol n. The aggregation module 7, disposed at the output of the fingers 14 of the rake, computes the sum (4) so as to produce an aggregate estimate of the symbol transmitted. It is initialized to zero before the first iteration, so that $X(n)=X_i(n)$ on completion of the previous operations for the first path i, where $X(n)$ is the output value from the aggregation module 7.

Furthermore, the estimation module 15, at the output of the aggregation module 7, makes it possible to obtain a soft estimate $W(n)$ of each symbol n transmitted, as a function of the modulation used and on the basis of the value $X(n)$ obtained.

When the symbols transmitted are binary, with BPSK ("Binary Phase Shift Keying") type modulation, as is the case for the uplinks in the UMTS system, $W(n)$ is the real part of the sum $X(n)$ supplied by the aggregation module 7. Its sign constitutes the hard estimate of the bit n and its absolute value, referred to the estimated power of the noise $N_0$, measures as a first approximation the likelihood of this hard estimate, that is to say a parameter of reliability of the aggregate estimate $X(n)$ obtained.

When the symbols transmitted are quaternary, with QPSK ("Quaternary Phase Shift Keying") type modulation, as is the case for the downlinks in the UMTS system, the information transmitted in the signal y(t) is coded on symbols comprising two bits each. The value $X(n)$ obtained on completion of the despreading performed by the first finger of the rake and of the weighting operation 6 is a complex value. The soft estimate $W(n)$ is equal to $X(n)$ in this case. It can be compared with the constellation of the QPSK modulation. The combination of the signs of the real and imaginary parts of $W(n)$ constitutes the hard estimate of the bit n and a combination of their absolute values, referred to the estimated power of the noise $N_0$, measures as a first approximation the likelihood of this hard estimate. A parameter of reliability of the soft estimate thus obtained can therefore consist for example of the smallest of the absolute values of the real and imaginary parts of $W(n)$.

The reliability parameter determined, as a function of the estimates obtained and of the modulation used, is then indicated to the module 8 of the receiver 1, responsible for verifying whether the reliability parameter does or does not satisfy a confidence criterion.

Figure 2:
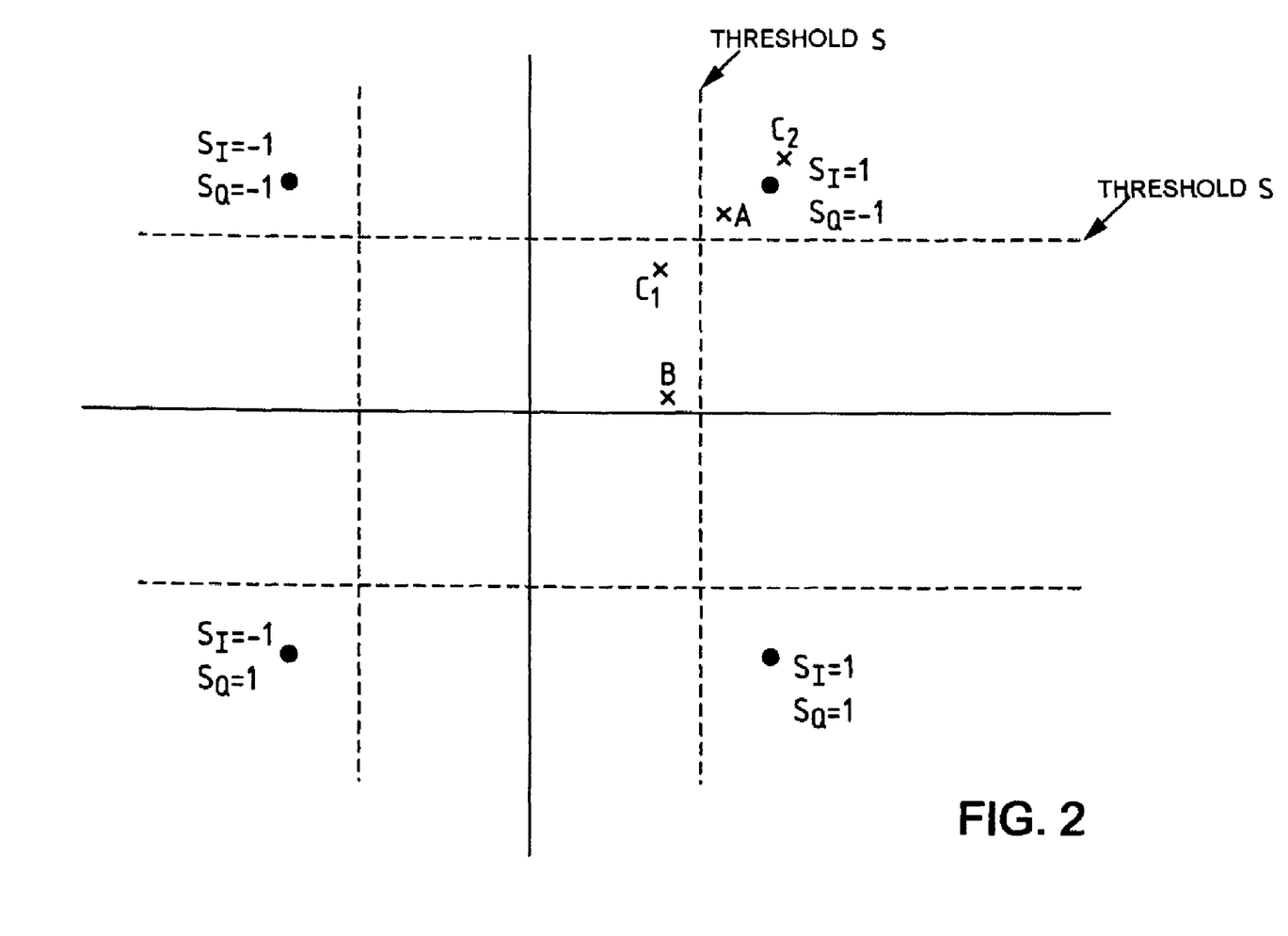
FIG. 2 is a chart showing a decision mode usable in an embodiment of the invention with QPSK modulation.

The verification of this criterion may for example consist of a comparison of the calculated reliability parameter with a threshold. FIG. 2 shows a diagram illustrating a decision taking in respect of an estimated information symbol. The estimate of the symbol is plotted on a plane as a function of the phase and the level of the corresponding signal received.

According to QPSK modulation, a signal portion having a phase shift of π/4 contains a binary "1" on the I pathway ($S_I$) which carries the odd-numbered bits and a binary "−1" on the Q pathway ($S_Q$) which carries the even-numbered bits. Such a symbol can therefore be represented in a phase chart, according to FIG. 2, in an upper right quarter plane. In the same manner, a symbol carried by a signal portion phase-shifted by 3π/4 corresponds to two information bits $S_I=-1$ and $S_Q=-1$ and can be represented in an upper left quarter plane of a chart such as that of FIG. 2.

As indicated above, the soft estimate W(n) of the symbol n can therefore form the subject of a positioning on a phase chart such as that of FIG. 2. A threshold s may for example be chosen in such a way as to define half-planes on the constellation of FIG. 2, corresponding to a confidence level determined in respect of a decision taking with regard to the value of the symbol transmitted. Such a threshold may be used for each quarter plane of the phase chart as represented in FIG. 2.

Thus, if the soft estimate W(n) is positioned on the phase chart in a quarter plane defined by the threshold s in the upper right part of the phase chart, it is possible to decide that the symbol n transmitted may be regarded with sufficient reliability as a symbol carrying the binary information $S_I=1$ and $S_Q=-1$. The estimate, represented in FIG. 2, of the symbol A is in this configuration. The receiver can decide that the symbol A can be regarded as the symbol containing the bits $S_I=1$ and $S_Q=-1$, since the latter lies beyond the threshold S, in terms of abscissa and ordinate.

Stated otherwise, if the smallest value out of the absolute value of the real part of W(n) (abscissa axis) and the absolute value of the imaginary part of W(n) (ordinate axis) is greater than the threshold s, the symbol n may be regarded as akin to the binary values $S_I=1$ and $S_Q=-1$, with the chosen confidence level.

The threshold s is proportional to the noise level $N_0$ estimated by the probing module 4. The coefficient of proportionality can have a predefined value. This value can furthermore depend on the service required by the communication giving rise to the signal received. It can thus have different values depending on the binary error rate permitted for a given service (voice communication, data transfer, high bit rate transfer, etc.).

In the case of the estimate of the symbol A (FIG. 2), the confidence criterion is satisfied so that a decision can be taken regarding the corresponding binary information in a decision module 10.

In another case, the estimate of the symbol B, once plotted on the chart of FIG. 2, lies short of at least one half-plane defined by the threshold s, in terms of abscissa or ordinate, that is to say the reliability parameter which is associated therewith is less than the threshold s. In this case, the confidence criterion is not fulfilled. The receiver 1 can then decide that the estimate already made is not sufficiently reliable. In the example illustrated in FIG. 2 for example, the symbol B could contain the bits $S_I=1$ and $S_Q=-1$, but it could just as well contain for example the bits $S_I=1$ and $S_Q=1$.

This signifies that the operations performed upstream in respect of the first finger of the rake are insufficient to satisfy the confidence criterion chosen. In the case set forth above, only one propagation path identified in the response of the channel formed the subject of a despreading of the radio signal y(t). The symbol estimation was therefore limited to the analysis of the corresponding signal over a single path out of the entire set of main paths detected on the relevant propagation channel.

If the comparison performed by the module 8 makes it possible to reach a conclusion regarding the value of the relevant symbol (as in the case of the symbol A above), that is to say regarding the information that is carries, with the confidence level fixed by the value of the threshold s, the module 8 then communicates the value of the corresponding estimate W(n) to the decision module 10, for a definitive decision taking.

If, on the other hand, the confidence criterion is not fulfilled by the estimated reliability parameter, the evaluation does not make it possible to reach a definitive conclusion regarding the value of the relevant symbol (case of the symbol B above) and the module 8 informs the monitoring module 9 thereof. The latter then instructs the implementation of the same operations as before, in particular despreading, for at least one other path identified during the channel probing.

In the example described, the module 9 instructs the despreading, by a second finger, of the signal corresponding to the second path of greatest energy of the propagation profile. Advantageously a memory, upstream of the fingers of the rake, provisionally stores samples of the sampled signal y(t), so as to be able to call upon same during the despreading of a portion of the signal for each of the fingers of the rake employed in succession. In this case, the monitoring module 9 also instructs this memory to supply the pertinent samples to the finger 14 of the activated rake. Likewise, an estimate of the complex amplitude $A_i(n)$ of the signal y(t) for the second path i is made.

The MRC weighting of the result of the new despreading by the conjugate of the new complex amplitude $A_i(n)$ calculated, makes it possible to obtain a new estimate $X_i(n)$ of the symbol n over the second path of greatest energy.

The aggregation module 7 then intervenes to perform a summation of the values $X_i(n)$ received from the module 6 subsequent to the contribution of each finger of the activated rake, i.e. According to $$X(n) = \sum_i X_i(n).$$

another notation, if $X_1(n)$ and $X_2(n)$ are the estimates of the symbol n that are obtained by the use respectively of the first and the second finger of the rake, on a first and a second path respectively, the new estimated reliability parameter can therefore be written $X(n)=X_1(n)+X_2(n)$.

An aggregate value X(n) relating to the symbol n according to each of the fingers activated in succession by the monitoring module 9 is thus returned to the module 8 by the aggregation module 7. For this purpose, the module 7 will have means of storage for holding each estimate $X_i(n)$ in memory, on completion of each new despreading of the signal y(t), so as to be able to compute the aggregate of these estimates after each activation of a new finger of the rake.

A soft estimate W(n) can then be calculated for the symbol n, from the aggregate estimate X(n) and as a function of the modulation used. A reliability parameter such as described above will be determined on the basis of this soft estimate so as to be compared with a threshold s.

To illustrate this operation, let us consider the symbol C (FIG. 2) is carried by the signal received y(t). A first despreading of the signal on the basis of the first finger of the rake has made it possible to make a first estimate of the symbol C, which estimate is referred to in FIG. 2 according to the notation $C_1$. As for the symbol B in the previous example, the reliability parameter corresponding to $C_1$ is less than the threshold s so that a decision regarding the content of the symbol C estimated cannot be taken with a sufficient level of confidence. After having added the contribution obtained by the second finger of the rake, an estimate W(n) is for example obtained corresponding to the point $C_2$ in FIG. 2, deemed sufficiently reliable by the module 8 for it to be possible to take the 1, −1 decision regarding the value of the symbol.

If the estimate obtained after the aggregation operation is still insufficient to take a reliable decision, that is to say if the confidence criterion is not fulfilled by the updated reliability parameter, the monitoring module 9 is alerted thereto and it instructs the activation of the next finger. This mechanism can then continue in this way until all the fingers have been invoked so as to form the subject of a despreading of the portion of received signal carrying the symbol to be estimated for a respective path, or else until the reliability parameter, updated after each new estimate, exceeds the threshold s, that is to say until an estimate sufficient to take a reliable decision is obtained.

As indicated earlier, the despreading is a complex operation since it involves a weighting of each binary element of the signal sampled by a corresponding code element. The same holds for the estimate of the complex amplitude $A_i(n)$ coupled with this operation of despreading in each finger. The potential reduction in the number of despreadings required, which number is limited to a few fingers out of the entire set of fingers available in the rake receiver, makes it possible to greatly decrease the number of calculations implemented by the receiver. As a result of this, in addition to the availability of the means of calculation for other purposes (for example to devote more fingers to the demodulation of symbols received under worse conditions), there is a limitation of the receiver's battery consumption in the case where the receiver is disposed in a mobile terminal for example.

Considered hereinabove was the case of a signal received from a sender. In another embodiment of the invention, the signal received consists of the contribution from several senders. Such is the case for example where the receiver is embedded within a mobile terminal in a macrodiversity situation, that is to say in simultaneous communication with several base stations. In this case, the fingers of the rake are used in the same manner as before, if only that the paths are any of those of several channels, emanating from one of the senders sending to the receiver 1. Of course, the despreading of a path will then have to take into consideration the appropriate spreading code $c^k(t)$ for each channel k involved.

Figure 3:
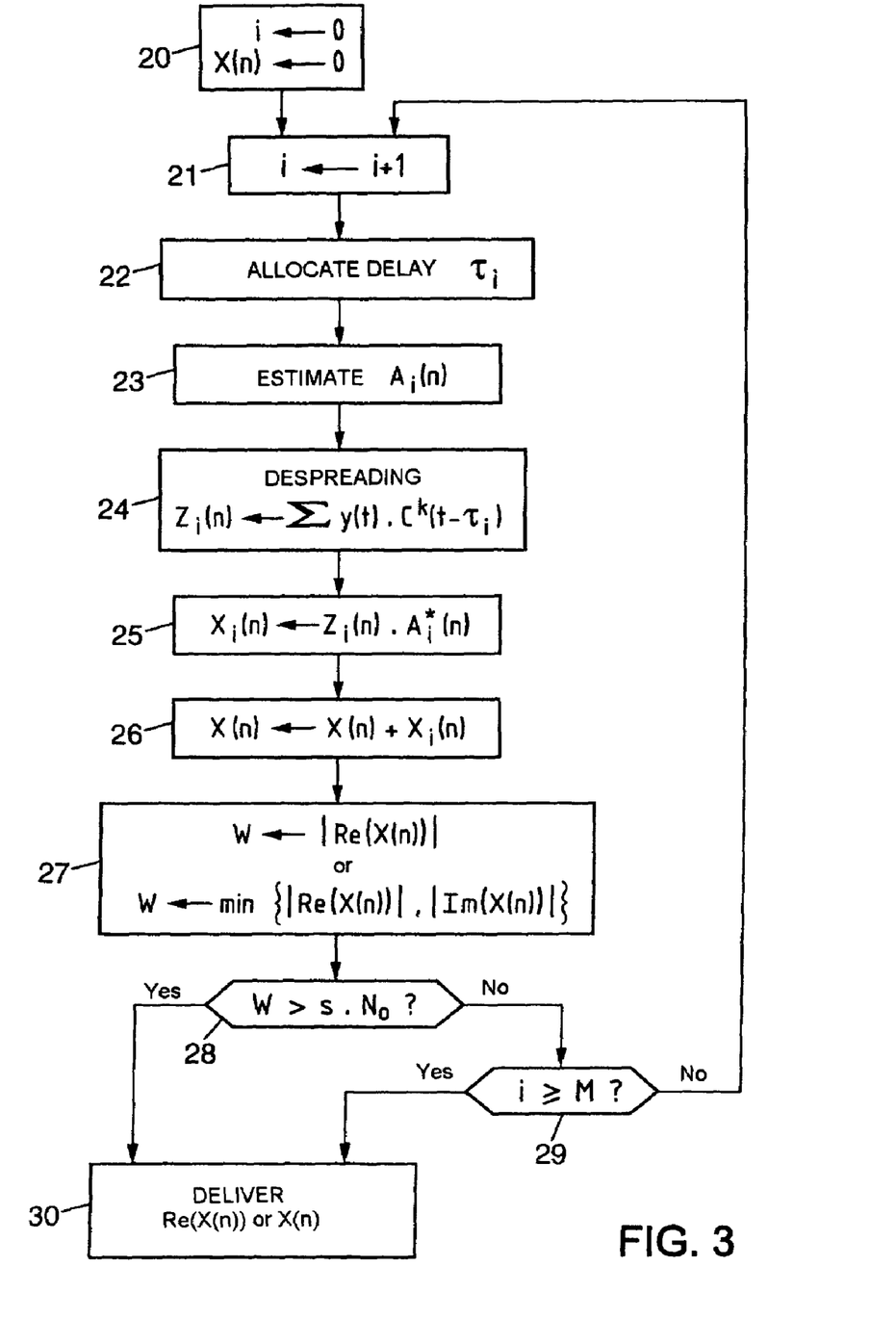
FIG. 3 is a flowchart of an exemplary method according to the invention.

An exemplary iterative procedure, monitored by the module 9, for estimating a symbol n by progressively adding paths until a confidence level defined by a threshold s is reached, is illustrated by FIG. 3. The delays $\tau_i$, the associated reception energies $E_i$ and the noise level $N_0$ have been calculated previously in a conventional manner by the probing module 4. It is assumed here that the delays $\tau_1$, $\tau_2$, ... are arranged in a list sorted in the order of descending reception energies. The procedure processes the input data consisting of the samples of the signal y(t) over the duration of a symbol. Each iteration in the loop corresponds to a finger of the rake.

The loop index i and the complex estimate X(n) of the symbol are initialized to zero in step 20. When it is determined that a new path must be taken into account, the path index i is incremented in step 21 and the i-th delay of the list is allotted in step 22. In step 22, it can be specified which spreading code $c^k(t)$ is to be used to despread (in a macrodiversity situation, the paths may not all originate from the same sender, and this may require despreadings according to several codes). The reception amplitude $A_i(n)$ is then estimated in step 23 with the aid of the delay $\tau_i$ (operation of the module 12). This estimate is for example made on the basis of pilot signals transmitted in parallel on another channel code and despread with this code delayed by $\tau_i$. The despreading of the signal received on the channel ck is performed according to (2) in step 24 (operation of the module 5), the MRC weighting according to (3) in step 25 (operation of the module 6) and the accumulation in step 26 (operation of the module 7). In step 27, the reliability parameter W is evaluated as being the absolute value of the real part of X(n) in the case of BPSK modulation or the smallest of the absolute values of the real part and of the imaginary part of X(n) in the case of QPSK modulation.

If the estimate of the symbol is not deemed to be sufficiently reliable in step 28 ($W \leq s.N_0$), then in step 29 one examines whether the maximum number of paths M has been reached. If paths still remain (i<M), the procedure returns to the step for taking into account the next path. When a sufficiently reliable estimate is obtained ($W > S.N_0$ in step 28) or when the maximum number of paths has been reached ($i \geq M$ in step 29), the soft estimate of the symbol n is delivered in step 30 as being the real part of X(n) in the case of BPSK modulation or directly the complex estimate X(n) in the case of QPSK modulation.

A procedure such as that illustrated by FIG. 3 can be implemented by programming a digital signal processor envisaged in the radio receiver.

The invention claimed is:

1. Method of signal processing for a spread spectrum digital radio communication receiver, comprising the following steps:
   calculation of an estimate of at least one symbol transmitted by sending means by applying to a radio signal received a processing taking into account at least one propagation path from the sending means;
   evaluation of a parameter of reliability of the calculated estimate; and
   when the reliability parameter evaluated does not satisfy a confidence criterion, calculation of a refined estimate of the symbol by taking into account at least one additional propagation path from the sending means in the processing applied to the radio signal received.

2. Method according to claim 1, in which the steps of evaluating the reliability, parameter and of calculating a refined estimate are repeated for as long as the evaluated reliability parameter does not satisfy the confidence criterion and for as long as at least one path out of a maximum number of propagation paths from the sending means has not yet been taken into account in a new estimate of the symbol.

3. Method according to claim 1, in which, prior to the said processing applied to the radio signal received, a probing is performed that identifies, on the basis of an analysis of an impulse response of a propagation channel between the sending means and the receiver, respective delays and energies of reception for the said propagation paths.

4. Method according to claim 3, in which the propagation paths are ranked according to a descending order of their respective reception energies and in which the additional propagation path taken into account in the calculation of the refined estimate of the symbol is the propagation path which, according to the said ranking, immediately follows the propagation path taken into account in the calculation of the previous estimate.

5. Method according to claim 1, in which the radio signal is a binary modulation signal, and the parameter of reliability of the calculated estimate of a symbol is proportional to the absolute value of the said estimate.

6. Method according to claim 1, in which the radio signal is a quaternary modulation signal, and the parameter of reliability of the calculated estimate of a symbol is proportional to the smallest of the absolute values of the real and imaginary parts of the said estimate.

7. Method according to claim 1, in which the confidence criterion consists in the parameter of reliability of the calculated estimate exceeding a threshold.

8. Method according to claim 7, in which the said threshold depends on a service life allocated to a communication to which the radio signal received pertains.

9. Method according to claim 7, in which the said threshold depends on a noise level estimated over a propagation channel between the sending means and the receiver.

10. Method according to claim 1, in which the refined estimate of the symbol is calculated by adding an estimated contribution of the said additional propagation path to the estimate previously calculated for the symbol.

11. Method according to claim 1, in which the propagation paths taken into account in the calculations of estimates include paths originating from several senders belonging to the said sending means, which send radio signal components that carry identical information symbols and that are multiplexed with different spreading codes.

12. Spread spectrum digital radio communication receiver, comprising the following signal processing means
   means for calculating an estimate of at least one symbol transmitted by sending means by applying to a radio signal received a processing taking into account at least one propagation path from the sending means;
   means for evaluating a parameter of reliability of the calculated estimate; and
   means for, when the reliability parameter evaluated does not satisfy a confidence criterion, calculating a refined estimate of the symbol by taking into account at least one additional propagation path from the sending means in the processing means applying to the radio signal received.

13. Spread spectrum digital radio communication receiver according to claim 12, in which the means for evaluating the reliability parameter and the means for calculating a refined estimate are carried out repeatedly for as long as the evaluated reliability parameter does not satisfy the confidence criterion and for as long as at least one path out of a maximum number of propagation paths from the sending means has not yet been taken into account in a new estimate of the symbol.

14. Spread spectrum digital radio communication receiver according to claim 12, comprising further means for, before carrying out the said processing means applied to the radio signal received, performing a probing that identifies, on the basis of an analysis of an impulse response of a propagation channel between the sending means and the receiver, respective delays and energies of reception for the said propagation paths.

15. Spread spectrum digital radio communication receiver according to claim 14, comprising further means for ranking the propagation paths according to a descending order of their respective reception energies and in which the additional propagation path taken into account by the means for calculating the refined estimate of the symbol is the propagation path which, according to the said ranking, immediately follows the propagation path taken into account in the calculation of the previous estimate.

16. Spread spectrum digital radio communication receiver according to claim 12, in which the radio signal is a binary modulation signal, and the parameter of reliability of the calculated estimate of a symbol is proportional to the absolute value of the said estimate.

17. Spread spectrum digital radio communication receiver according to claim 12, in which the radio signal is a quaternary modulation signal, and the parameter of reliability of the calculated estimate of a symbol is proportional to the smallest of the absolute values of the real and imaginary parts of the said estimate.

18. Spread spectrum digital radio communication receiver according to claim 12, in which the confidence criterion consists in the parameter of reliability of the calculated estimate exceeding a threshold.

19. Spread spectrum digital radio communication receiver according to claim 18, in which the said threshold depends on a service life allocated to a communication to which the radio signal received pertains.

20. Spread spectrum digital radio communication receiver according to claim 18, in which the said threshold depends on a noise level estimated over a propagation channel between the sending means and the receiver.

21. Spread spectrum digital radio communication receiver according to claim 12, in which the means for calculating the refined estimate of the symbol comprise means for adding an estimated contribution of the said additional propagation path to the estimate previously calculated for the symbol.

22. Spread spectrum digital radio communication receiver according to claim 12, in which the propagation paths taken into account by the means for calculating the estimates include paths originating from several senders belonging to the said sending means, which send radio signal components that carry identical information symbols and that are multiplexed with different spreading codes.

23. A computer readable storage medium having embodied thereon a computer program to be installed in a radio communication receiver, the program comprising instructions for implementing the following steps upon execution of the program by signal processing means of the receiver:
   calculation of an estimate of at least one symbol transmitted by sending means by applying to a radio signal received a processing taking into account at least one propagation path from the sending means;
   evaluation of a parameter of reliability of the calculated estimate; and when the reliability parameter evaluated does not satisfy a confidence criterion, calculation of a refined estimate of the symbol by taking into account at least one additional propagation path from the sending means in the processing applied to the radio signal received.

24. The computer readable storage medium according to claim 23, in which the steps of evaluating the reliability parameter and of calculating a refined estimate are repeated for as long as the evaluated reliability parameter does not satisfy the confidence criterion and for as long as at least one path out of a maximum number of propagation paths from the sending means has not yet been taken into account in a new estimate of the symbol.

25. The computer readable storage medium according to claim 23, in which, prior to the said processing applying to the radio signal received, a probing is performed that identifies, on the basis of an analysis of an impulse response of a propagation channel between the sending means and the receiver, respective delays and energies of reception for the said propagation paths.

26. The computer readable storage medium according to claim 25, in which the propagation paths are ranked according to a descending order of their respective reception energies and in which the additional propagation path taken into account in the calculation of the refined estimate of the symbol is the propagation path which, according to the said ranking, immediately follows the propagation path taken into account in the calculation of the previous estimate.

27. The computer readable storage medium according to claim 23, in which the radio signal is a binary modulation signal, and the parameter of reliability of the calculated estimate of a symbol is proportional to the absolute value of the said estimate.

28. The computer readable storage medium according to claim 23, in which the radio signal is a quaternary modulation signal, and the parameter of reliability of the calculated estimate of a symbol is proportional to the smallest of the absolute values of the real and imaginary parts of the said estimate.

29. The computer readable storage medium according to claim 23, in which the confidence criterion consists in the parameter of reliability of the calculated estimate exceeding a threshold.

30. The computer readable storage medium according to claim 29, in which the said threshold depends on a service life allocated to a communication to which the radio signal received pertains.

31. The computer readable storage medium according to claim 29, in which the said threshold depends on a noise level estimated over a propagation channel between the sending means and the receiver.

32. The computer readable storage medium according to claim 23, in which the refined estimate of the symbol is calculated by adding an estimated contribution of the said additional propagation path to the estimate previously calculated for the symbol.

33. The computer readable storage medium according to claim 23, in which the propagation paths taken into account in the calculations of estimates include paths originating from several senders belonging to the said sending means, which send radio signal components that carry identical information symbols and that are multiplexed with different spreading codes.

* * * * *